(12) United States Patent
Eisenbeiser

(10) Patent No.: US 7,682,733 B2
(45) Date of Patent: Mar. 23, 2010

(54) THIN FILM BATTERY HAVING TEXTURED LAYER

(75) Inventor: Kurt W. Eisenbeiser, Tempe, AZ (US)

(73) Assignee: Motorola, Inc., Schaumburg, IL (US)

( * ) Notice: Subject to any disclaimer, the term of this patent is extended or adjusted under 35 U.S.C. 154(b) by 818 days.

(21) Appl. No.: 11/510,548

(22) Filed: Aug. 25, 2006

(65) Prior Publication Data

US 2008/0050656 A1    Feb. 28, 2008

(51) Int. Cl.
*H01M 6/12* (2006.01)

(52) U.S. Cl. ..................... 429/162; 29/623.5

(58) Field of Classification Search ........... 429/162; 29/623.5
See application file for complete search history.

(56) References Cited

U.S. PATENT DOCUMENTS

| | | | | |
|---|---|---|---|---|
| 5,294,504 A | * | 3/1994 | Otagawa et al. | 429/213 |
| 5,338,625 A | | 8/1994 | Bates | |
| 5,612,152 A | * | 3/1997 | Bates | 429/152 |
| 6,447,957 B1 | * | 9/2002 | Sakamoto et al. | 429/242 |
| 6,495,283 B1 | * | 12/2002 | Yoon et al. | 429/162 |
| 2005/0186469 A1 | * | 8/2005 | De Jonghe et al. | 429/137 |

FOREIGN PATENT DOCUMENTS

WO    WO 2005/027245 A2    3/2005

\* cited by examiner

*Primary Examiner*—Dah-Wei D Yuan
*Assistant Examiner*—Jacob Marks

(57) ABSTRACT

A monolithically integrated lithium thin film battery (10) provides increased areal capacity on a single level (without stacking of multiple cells). The Lithium thin film battery (10) comprises a substrate (12) having a surface (13) textured to comprise a plurality of openings (16) having sides (15) angled between 10 and 80 degrees to the surface (13). A current collector (18) and a cathode (22) are formed on the substrate (12) and within the openings (16). An electrolyte (24) comprising lithium phosphorous oxynitride is formed by physical vapor deposition on the cathode (22), thereby providing a layer on the surface of the cathode (22) and within the openings (16) of the cathode having substantially the same thickness. An anode (26) and a capping layer (28) are then formed on the electrolyte (24).

14 Claims, 1 Drawing Sheet

THIN FILM BATTERY HAVING TEXTURED LAYER

FIELD OF THE INVENTION

The present invention generally relates to thin batteries and more particularly to a lithium thin film battery having a cathode structure providing an increased power density.

BACKGROUND OF THE INVENTION

Lithium ion batteries are used in many consumer applications due to their high energy density and their long lifetime. Lithium thin film batteries differ from Lithium ion batteries in several important ways. Thin film batteries use a solid electrolyte instead of the liquid or gel electrolyte used in Lithium ion and Lithium polymer batteries (U.S. Pat. No. 5,338,625). The solid electrolyte prevents dendimer growth from a Lithium anode, so unlike Lithium ion or Lithium polymer batteries, a Lithium anode can be used in thin film batteries in rechargeable applications. The use of a Lithium anode can increase the theoretical capacity of the battery ten times compared to a Lithium ion cell. The solid electrolyte also makes packaging the cell much easier. With a liquid electrolyte, a 'can' is used to encapsulate the battery and seal in the electrolyte. As the size of the battery is scaled down, a larger fraction of the volume is needed for this packaging, thereby reducing the energy density of the battery. With the solid electrolyte of a Lithium thin film battery, a very thin encapsulation layer is used to prevent oxidation of the Lithium anode. Thus, thin film batteries can be scaled down more efficiently than Lithium ion or Lithium polymer batteries. Furthermore, the solid electrolyte provides a very stable interface between the anode and the cathode. Due to this stability, the cycleability of the cell is significantly improved by between 10× to 100×, compared to Lithium ion batteries.

One of the key drawbacks to Lithium thin film batteries is their scalability. They scale very well to small dimensions, but for applications that demand higher areal energy density, their scaling is limited. As Lithium ions are moved from the anode to the cathode and intercalated into the cathode, the volume of the cathode changes. Since the electrolyte is a solid, it is difficult to accommodate these volume changes and ionic conductivity is reduced. As the cathode becomes thicker, the stresses due to the volume expansion become worse. This mechanism will eventually limit the capacity that can be gained by scaling up the thickness of the cathode. When the cathode thickness exceeds about 10 micrometers, the power performance of the cell drops dramatically.

One known method of increasing the capacity of thin film batteries per unit area, taught in U.S. Pat. No. 5,612,152, comprises stacking multiple cells on top of each other. The cells are stacked by depositing the layers sequentially with almost a ten fold increase in capacity, however, stress buildup and cost limit further stacking. Stacking can also be accomplished with a packaged cell, but cost and capacity density are issues with this approach. A further method involves forming the battery on the sidewalls of high aspect ratio trenches (PCT Publication Number WO 2005/027245 A2). This approach offers good scalability for small increases in cost; however, the solid electrolyte is deposited by physical vapor deposition in which conformal coating can not be achieved on sidewalls, preventing fabrication of batteries.

Accordingly, it is desirable to provide an monolithically integrated Lithium thin film battery that provides increased areal capacity on a single level (without stacking of multiple cells). Furthermore, other desirable features and characteristics of the present invention will become apparent from the subsequent detailed description of the invention and the appended claims, taken in conjunction with the accompanying drawings and this background of the invention.

BRIEF SUMMARY OF THE INVENTION

A monolithically integrated lithium thin film battery provides increased areal capacity on a single level. The Lithium thin film battery comprises a substrate having a surface textured to comprise a plurality of openings having sides angled between 10 and 80 degrees to the surface. A current collector and a cathode are formed on the substrate and within the openings. An electrolyte comprising lithium phosphorous oxynitride is formed by physical vapor deposition on the cathode, thereby providing a layer on the surface of the cathode and within the openings of the cathode having substantially the same thickness. An anode and a capping layer are then formed on the electrolyte.

BRIEF DESCRIPTION OF THE DRAWINGS

The present invention will hereinafter be described in conjunction with the following drawing figures, wherein like numerals denote like elements.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention.

The fabrication of integrated circuits, microelectronic devices, micro electro mechanical devices, microfluidic devices, and photonic devices, involves the creation of several layers of materials that interact in some fashion. One or more of these layers may be patterned so various regions of the layer have different electrical or other characteristics, which may be interconnected within the layer or to other layers to create electrical components and circuits. These regions may be created by selectively introducing or removing various materials. The patterns that define such regions are often created by lithographic processes. For example, a layer of photoresist material is applied onto a layer overlying a wafer substrate. A photomask (containing clear and opaque areas) is used to selectively expose this photoresist material by a form of radiation, such as ultraviolet light, electrons, or x-rays. Either the photoresist material exposed to the radiation, or that not exposed to the radiation, is removed by the application of a developer. An etch may then be applied to the layer not protected by the remaining resist, and when the resist is removed, the layer overlying the substrate is patterned. Alternatively, an additive process could also be used, e.g., building a structure using the photoresist as a template.

The Lithium thin film battery of the exemplary embodiment described herein comprises an increased areal capacity of the battery monolithically integrated on a single level using a physical vapor deposition. A substrate is textured (etched to form grooves) and a current collector, cathode, electrolyte, and anode are all deposited thereon. The texturing is on the same order of magnitude as the battery thickness, e.g., 15 micrometers, and has surfaces at least 10 degrees off vertical, which results in approximately doubling the capacity of the battery per unit area. Other geometries such as greater angles or compound angles could provide greater capacity increases. The patterns may be irregular, so random processes of a defined length scale could be used to inexpensively form the textured substrate.

Figure 1:
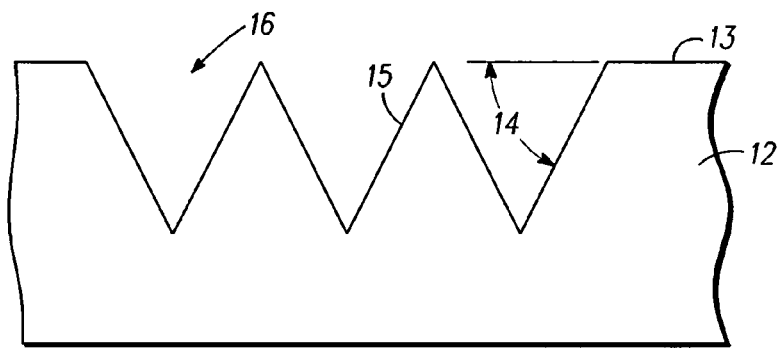
FIG. 1 is a partial cross sectional view of a first substrate textured for use with an exemplary embodiment.
Figure 2:
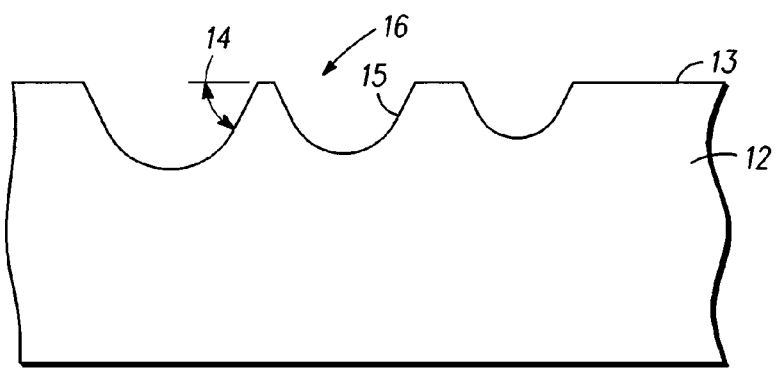
FIG. 2 is a partial cross sectional view of a second substrate textured for use with the exemplary embodiment.

Referring to FIG. 1, a substrate 12, typically comprising an insulator such as silicon, is etched at angles 14 between 10 degrees and 80 degrees, and more preferably between 54 degrees and 72 degrees to form grooves 16. The etch is preferably performed by a dry reactive ion etch or a wet chemical etch known to those in the industry, for example, though any type of process may be used to texture the substrate 12 to provide angled sides 15. The substrate may comprise a thickness of several hundred microns; however, preferably comprises a thickness similar to the thickness of the thin film batter layers, on the order of 20 to 30 microns. The grooves 16 may comprise any type of opening, e.g., channels or craters, and may comprise irregular spacing, depths, and shapes as long as most of each side 15 of the openings comprise between 10 and 80 degrees (see FIG. 2 as an example). In the illustrated exemplary embodiment, the period of the grooves 16 is preferably between 50 and 100 microns.

Figure 3:
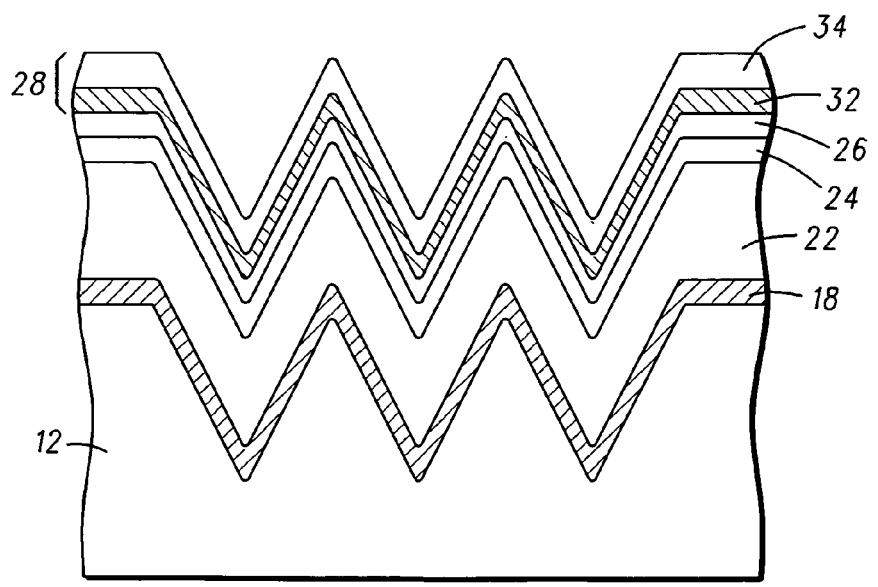
FIG. 3 is a partial cross sectional view of the exemplary embodiment formed on the first substrate.

Referring to FIG. 3, once the substrate 12 is etched to form grooves 16, a current collector layer 18 is formed on the substrate 12, including in the grooves 16. The current collector layer 18 preferably is a metal such as gold having a thickness of between 0.1 and 10.0 microns and more preferably between 0.5 and 1.0 microns. Alternatively, a thin layer of stainless steel foil may be substituted for the substrate 12 and current collector 18; however, the stainless steel foil would be configured to form the grooves 16.

A cathode layer 22 of a material preferably comprising Lithium Cobalt Oxide is formed on the current collector layer 18 and having a thickness of between 1.0 and 30.0 microns and more preferably between 5.0 and 20.0 microns.

An electrolyte layer 24 comprising amorphous lithium phosphorus oxynitride is deposited by physical vapor deposition on the cathode layer 22 as a thin solid film. The electrolyte layer 24 comprises a thickness of preferably between 1.0 to 2.0 microns. As the layers 18 and 22 are formed within the grooves 16, the sides are maintained at substantially the same angle as formed within the substrate 12. When the electrolyte layer is deposited within the grooves 16 of the cathode layer 22, the material of the electrolyte layer 24 will form on the sides of the cathode layer. If the sides exceed 80 degrees, the physical vapor deposition process will not allow the electrolyte material to form on the sides with a thickness similar to the thickness on the surface. This thickness difference will lead to variations in battery performance within the cell and possible failure of the cell if the thickness is too small or too large. If the sides 16 are sloped at very small angels, e.g., less than 10 degrees, there will be very little improvement in the areal energy capacity of the battery. Within this range of 10 to 80 degrees a multitude of side profiles can be used to maximize performance for a given physical vapor deposition technique.

An anode layer 26 of a material comprising Lithium is formed on the electrolyte layer 24 and comprises a thickness of approximately 1.0 micron. A capping layer 28 comprises a metal layer 32 and a dielectric or polymer layer 34 formed on the anode layer 26. The capping layer 28 protects the Lithium anode layer 26 from the atmosphere. The metal layer 32 may also serve as a current collector for the anode layer 26.

As the electrolyte layer 24 is applied by physical vapor deposition, it would be preferable to apply the current collector 18, cathode layer 22, and anode layer 26 by physical vapor deposition also. However, for example, the current collector 18 and anode layer 26 may alternatively be applied by a thermal evaporation, and the cathode layer 22 may be alternatively applied by a chemical vapor deposition.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims.

The invention claimed is:

1. A thin film battery comprising:
a current collector having a surface configured to comprise a plurality of openings having sides angled between 10 and 80 degrees to the surface with respect to the thickness direction, the angled sides within each opening joined to one another;
a cathode formed on the current collector including within the openings;
an electrolyte formed by physical vapor deposition on the cathode including within the openings; and
an anode formed on the electrolyte including within the openings.

2. The thin film battery of claim 1 wherein the sides are angled between 54 and 72 degrees to the surface.

3. The thin film battery of claim 1 wherein the electrolyte comprises substantially the same thickness on the surface and on the sides.

4. The thin film battery of claim 3 wherein the electrolyte comprises lithium phosphorus oxynitride.

5. The thin film battery of claim 1 wherein the openings comprise grooves.

6. The thin film battery of claim 1 wherein the openings comprise an irregular depth and spacing.

7. The thin film battery of claim 1 further comprising a capping layer formed on the anode.

8. A thin film battery comprising:
a substrate having a surface textured to comprise a plurality of openings having sides angled between 10 and 80 degrees to the surface with respect to the thickness direction, the angled sides within each opening joined to one another;
a current collector formed on the substrate;
a cathode formed on the current collector;
an electrolyte comprising lithium phosphorus oxynitride formed by physical vapor deposition on the cathode; and
an anode formed on the electrolyte.

9. The thin film battery of claim 8 wherein the sides are angled between 54 and 72 degrees to the surface.

10. The thin film battery of claim 8 wherein the electrolyte comprises substantially the same thickness on the surface and on the sides.

11. The thin film battery of claim 8 wherein the openings comprise grooves.

12. The thin film battery of claim 8 wherein the openings comprise an irregular depth and spacing.

13. The thin film battery of claim 8 further comprising a capping layer formed on the anode.

14. A method of fabricating a thin film battery, the method comprising:

configuring a current collector having a surface to form a plurality of openings in the surface, the openings having sides angled between 10 and 80 degrees to the surface with respect to the thickness direction, the angled sides within each opening joined to one another;

forming a cathode on the surface and within the openings of the current collector;

depositing an electrolyte by physical vapor deposition on the cathode including within the openings; and forming an anode on the electrolyte.

\* \* \* \* \*